Aug. 20, 1946.  W. L. MORRISON  2,406,241
REFRIGERATED TRUCK
Filed Dec. 15, 1941    5 Sheets-Sheet 1

Inventor,
Willard L. Morrison
by Parker & Carter
Attorneys.

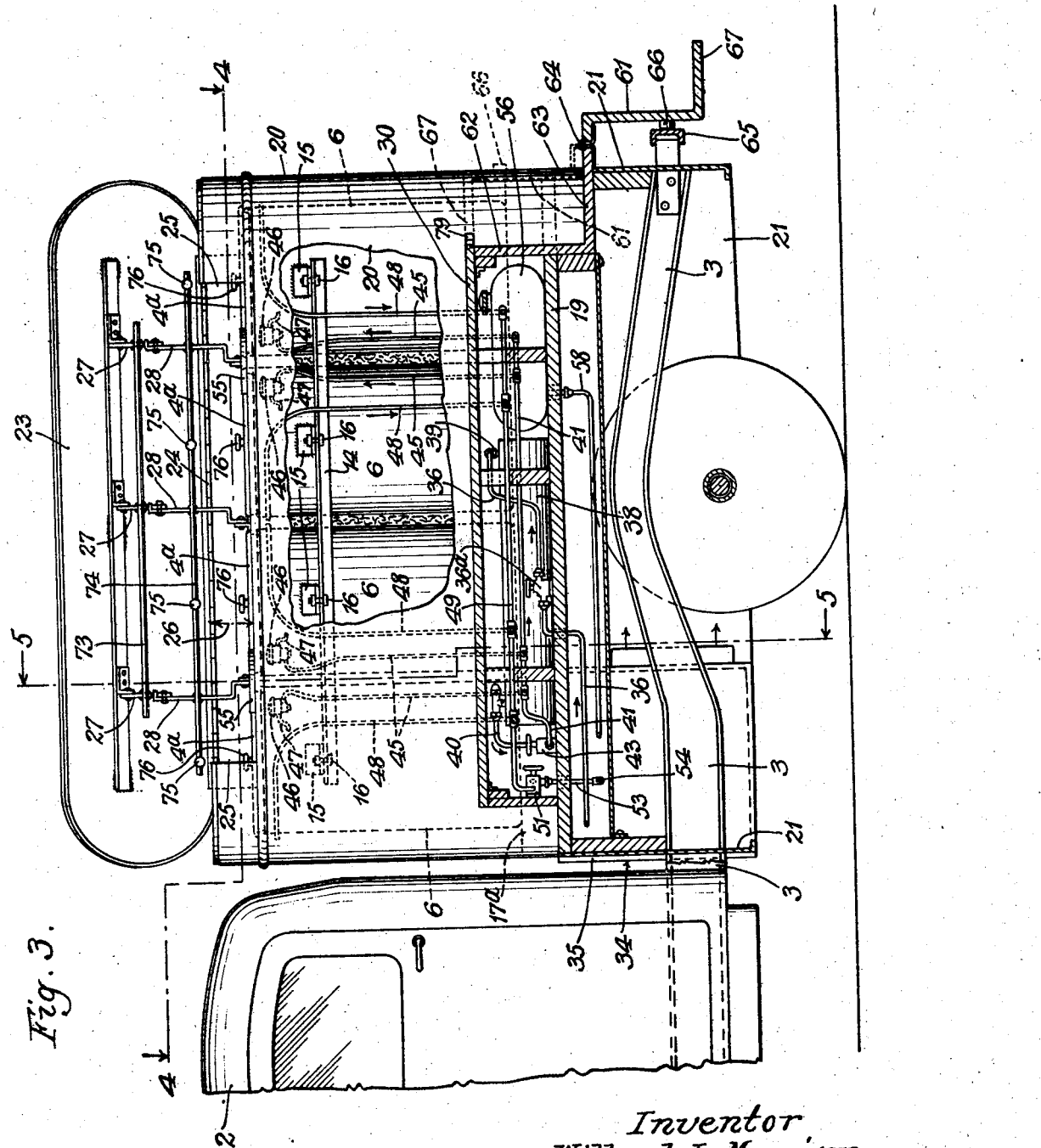

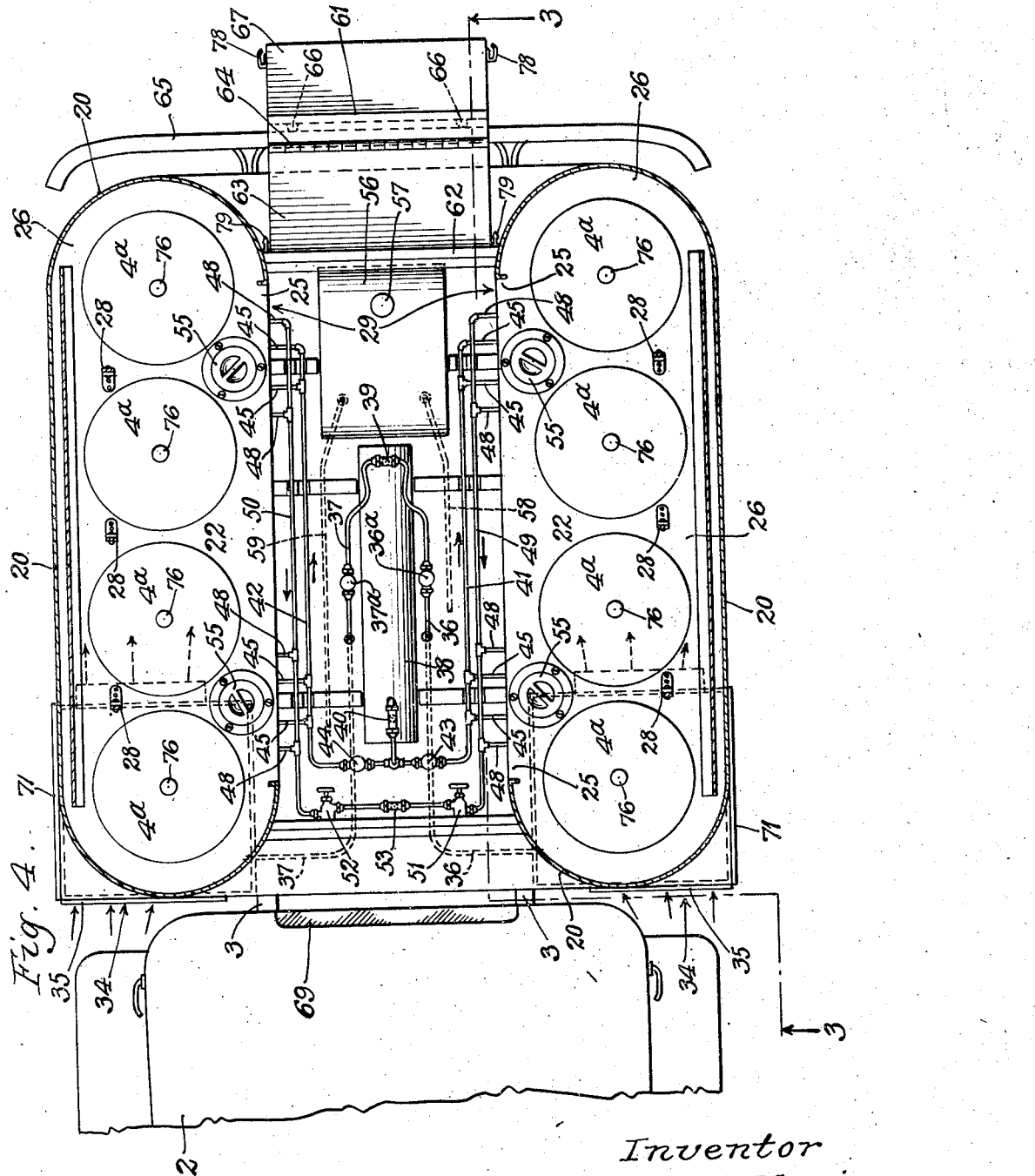

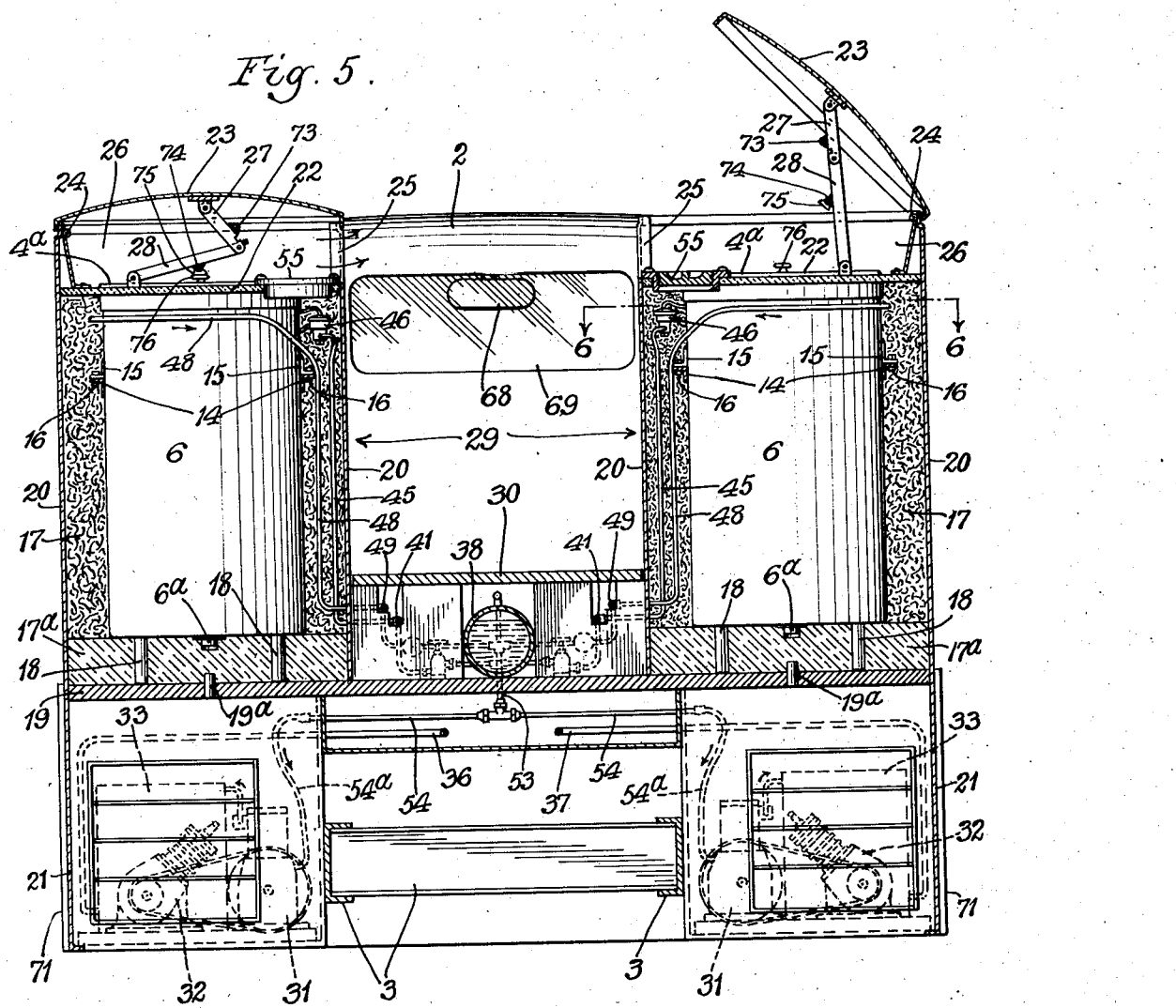

Aug. 20, 1946.  W. L. MORRISON  2,406,241
REFRIGERATED TRUCK
Filed Dec. 15, 1941  5 Sheets-Sheet 5
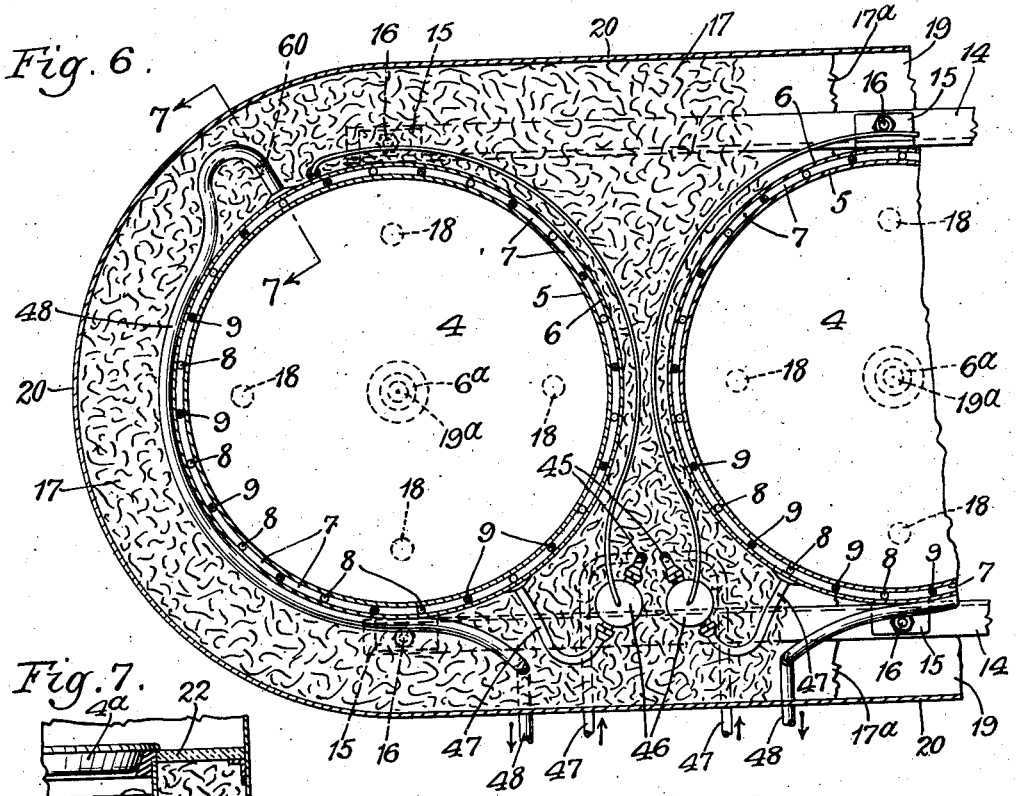
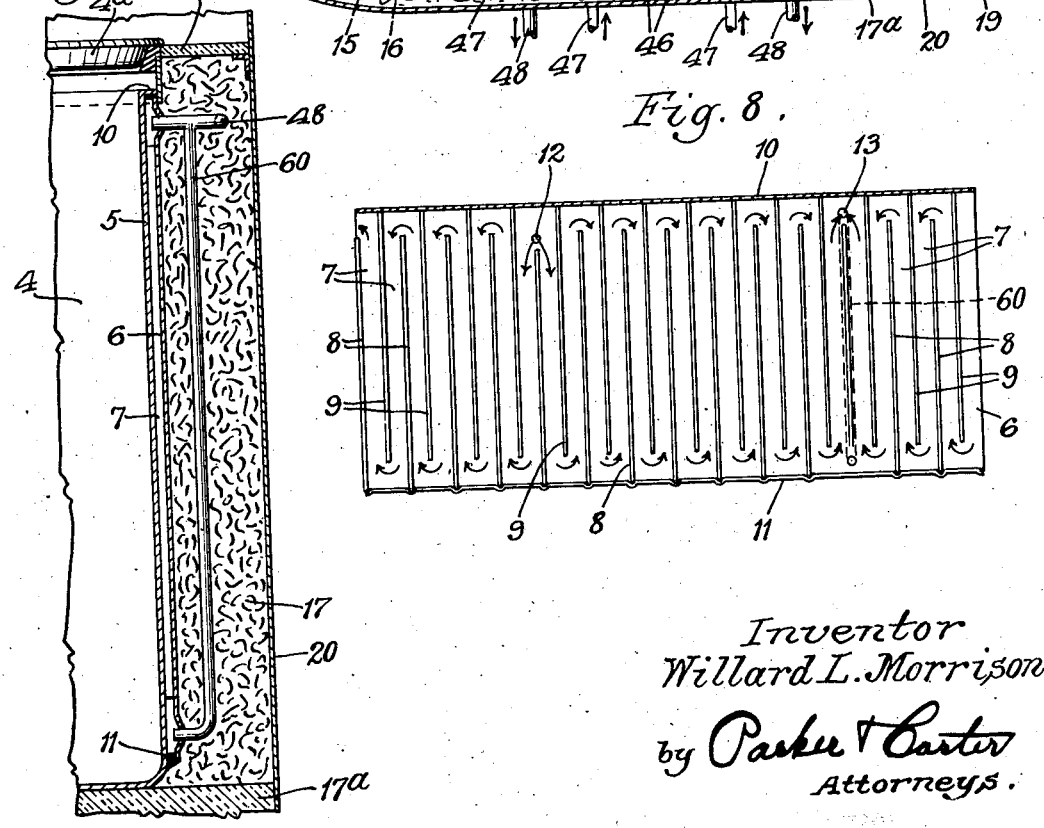
Inventor
Willard L. Morrison
by Parker & Carter
Attorneys.

Patented Aug. 20, 1946

2,406,241

UNITED STATES PATENT OFFICE 2,406,241

REFRIGERATED TRUCK

Willard L. Morrison, Lake Forest, Ill.

Application December 15, 1941, Serial No. 423,024

5 Claims. (Cl. 62—117)

This invention relates to refrigerated trucks and has for its object to provide a new and improved device of this description particularly adapted to deliver frozen foods.

The invention has as a further object to provide a refrigerated truck for delivering foods of different kinds in a refrigerated condition.

The invention has as a further object to provide a refrigerated truck having a plurality of separated insulated containers and one or more refrigerating machines, preferably gasoline operated and located forward of the insulated containers, and arranged so that the current of air produced by the motion of the truck contacts the condenser and other parts of the refrigerating apparatus so as to cool them.

The invention has as a further object to provide a refrigerated truck having a plurality of separate cooling containers into which different materials, such as meat, berries, fruit, vegetables, and the like, may be placed for delivery.

The invention has as a further object to provide a refrigerated truck which is free of any cold chamber into which the customer or delivery man must enter in removing or inspecting the refrigerated materials.

The invention has as a further object to provide a refrigerated truck arranged so that the refrigerated material can be removed without the cold air dropping out or being lost.

The invention has as a further object to provide a refrigerated truck for delivering refrigerated materials, arranged so that the driver has a clear rear view.

The invention has as a further object to provide a refrigerated truck for delivering refrigerated materials that may be called an open refrigerated truck.

The invention has as a further object to provide a refrigerated truck provided with a plurality of wholly independent containers in which the refrigerated materials are carried.

The invention has as a further object to provide a refrigerated truck with two sets of independent heat insulated containers separated by a space, by means of which access is secured to any one of the independent heat insulated containers.

The invention has as a further object to provide a refrigerated truck with two sets of heat insulated containers into which the material is received, said containers separated by a space which acts as a walk for parties seeking access to the containers.

The invention has as a further object to provide a refrigerated truck with two sets of separate refrigerated containers, separated by a space, the bottom of the space containing the pipes and connections for the refrigerant used in connection with the containers.

The invention has as a further object to provide a refrigerated truck having a plurality of independent refrigerated containers open at the top and having a radiant heat shield over them, arranged so that the heat due to the sun will pass out from under them and upward and not act to warm the material in the refrigerated containers.

The invention has other objects which are more particularly pointed out in the accompanying description.

I have illustrated in the drawings one form of truck embodying the invention wherein Fig. 1 is a perspective view of a refrigerated truck;

Fig. 3 is a sectional view taken on line 3—3 of Fig. 4 with the cover or radiant shield raised;

Fig. 4 is a sectional view taken on line 4—4 of Fig. 3;

Fig. 5 is a cross-section of the truck body taken on the line 5—5 of Fig. 3;

Fig. 6 is a detailed sectional view taken on line 6—6 of Fig. 5;

Fig. 7 is a detailed sectional view taken on line 7—7 of Fig. 6;

Fig. 8 is a view showing the development of the outer shell of the container.

Like numerals refer to like parts throughout the several figures.

Figure 1:
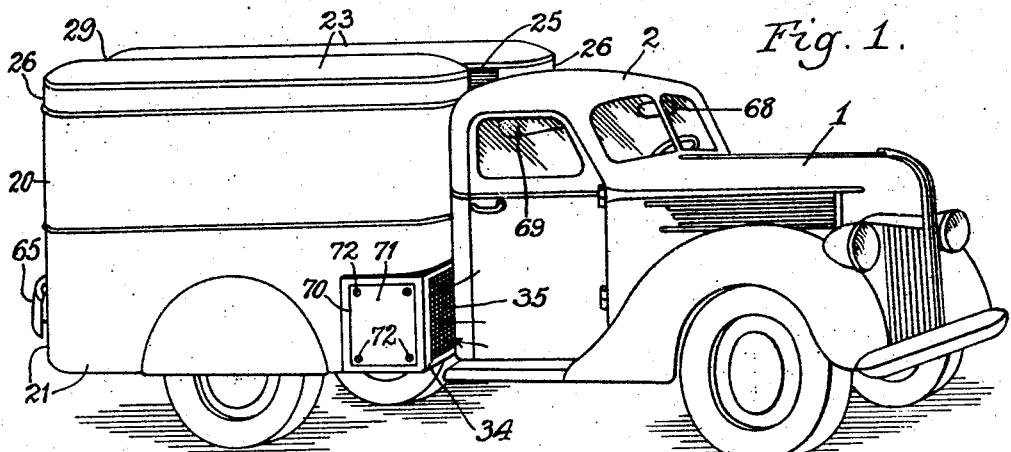

In the construction shown the truck is provided with any suitable motor, preferably the usual gasoline engine, located under the hood 1 and a cab 2 for the driver. Back of the cab and mounted upon the chassis 3 (Figs. 3, 4 and 5) are a plurality of containers 4. Each of these containers comprises an inner metal cylinder 5 into which the refrigerated material is received (Figs. 6 and 7). Surrounding the inner cylinder 5 is an outer cylinder 6. There is a space 7 between the two cylinders into which the refrigerant is received.

Means is provided for causing the refrigerant to travel back and forth longitudinally along the space between the cylinders. As herein shown, this is secured by providing a series of passage-forming members located between the cylinders 5 and 6 and in the space 7. These passage forming members are divided into two sets, the passage forming members 8 and the passage forming members 9. The passage forming members 8 extend from the bottom of the space to a point near the top thereof (see Fig. 8). The passage forming members 9 extend from the top of the space to a point near the bottom thereof. The ends of the space 7 are closed by the members 10 and 11 at the top and bottom. This forms a continuous passageway extending back and forth longitudinally of the cylinders and in the space between them along which the refrigerant material passes. These members are shown in Fig. 8 with relation to the outer cylinder 6. The refrigerant material preferably enters the space 7 near the top thereof at the point 12 (Fig. 8) where it divides, a portion of it passing back and forth along the sections formed by the passage forming members in one direction, as to the left, and a portion of it passing back and forth along the sections formed by the passage forming members, as for example to the right. These two portions are discharged from between the cylinders 5 and 6 through the opening 13. It will be seen that all of the carrying space in the containers and, therefore, for the entire truck, is surrounded by a primary cooling surface, and by means of this arrangement the refrigerant material divides into two portions, each of which passes only half way around the cylinders.

The truck is provided with a plurality of refrigerated containers, preferably divided into two sets, one set being on one side and the other set being on the other side, with a space between them. In the construction shown, there are four containers in each set, although of course more or less of these containers may be used as the conditions require.

The containers 4 of each set are preferably connected together in some suitable manner. In the construction shown, they are connected together by the connecting members 14, one on each side of each set and preferably near the top of the containers. These connected members may be connected to the outer cylinder in any desired manner. As herein shown, the outer cylinder has welded thereto the angle members 15 and these angle members are connected to the connecting members 14 by fastening members 16. These connecting members are shown as angle irons.

The several containers of each set are embedded in insulated material 17 which surrounds the cylinders and fills the space between them (see Fig. 6). There is an insulating member 17a extending along the bottom of each set of containers. The containers are closed at the bottom and there are a plurality of supports 18 extending through the insulation 17a and resting upon a base 19 attached to the chassis of the truck. This base is provided with locating members 19a which project into the insulation 17a so as to assist in holding it in proper position. There is an outer casing 20, preferably of metal, which extends around each set of containers. This casing is provided with a portion 21 which extends down to the bottom of the truck on the outside. There is preferably a cover member 22 which extends along the top of each set of containers and which is provided with openings for the upper ends of the containers. There are a series of covers 4a, preferably, one for each container, by means of which access is secured thereto.

Since the truck is used in the sun, I prefer to provide at the top of each set of containers a radiant heat interceptor 23 which is hinged at 24 and which is provided at one side, preferably the inside, with openings 25. Heated air, therefore, which tends to accumulate in the space 26 between this interceptor and the top of the container, being light, will pass out the openings 25 and escape and will not pass down into the container as the warm air always rises and never falls. Some suitable means is preferably provided for holding these interceptors in an open position when access to the containers is desired. For this purpose I have shown the members 27 pivoted to the interceptors and the members 28 pivoted to the member 22, the two being pivoted together.

One set of containers is placed at one side of the truck and the other set at the other side so that there is a space 29 between them. This space is provided with a floor 30, upon which the driver of the truck or the customers can stand in securing access to the containers on either side. In the space 29 beneath the floor 30 is located certain pipes and fittings for the refrigerating apparatus.

I have shown two different refrigerating elements, each comprising a compressor 31 and a motor 32, which is here shown as an internal combustion engine, and a condenser 33. I also prefer to provide a fan 33a for the condenser, which is driven from the motor 32, the motor driving the compressor 31 by means of the belt 31a.

The truck body has at each side the projecting parts 34 which project laterally out beyond the front or cab portion of the truck. The front portion of these projecting parts are provided with means for permitting air to pass therethrough when the truck is in motion, such as the grids 35. One refrigerating apparatus is located in each of these projecting portions. It will be seen that when the truck is in motion, air passes through the grids and in contact with the condensers and the remaining portions of the refrigerating apparatus so as to cool the same, the heat passing out to the rear of the truck.

I have shown two sets of refrigerating apparatus as a matter of safety, for either one alone is sufficient to properly refrigerate all of the containers.

Figure 2:
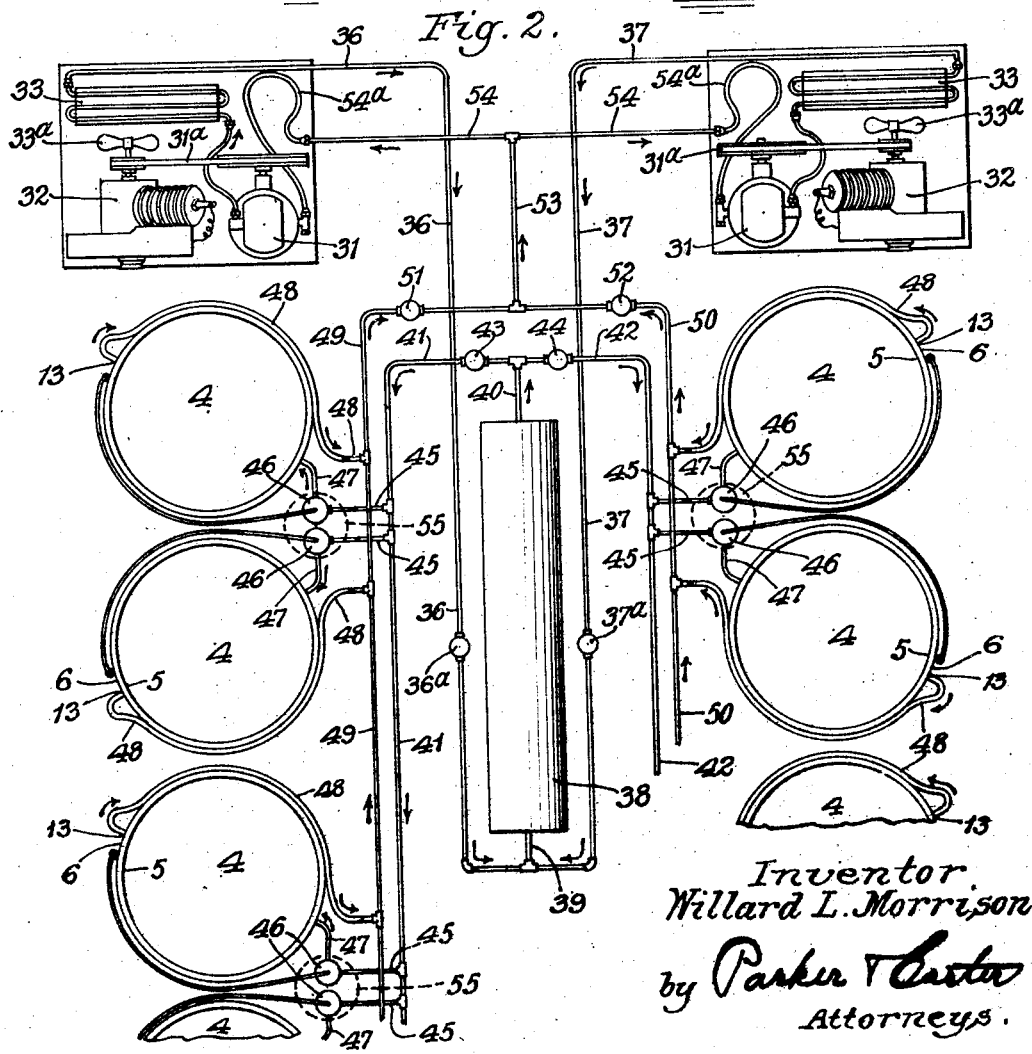
Fig. 2 is a diagrammatic plan view showing the containers, freezing units and piping.

The refrigerant from the refrigerating apparatus on the left (Fig. 2) passes from the condenser into the pipe 36 and the refrigerant from the refrigerating apparatus on the right passes from the condenser into the pipe 37. These pipes are provided with valves 36a and 37a. Both of these pipes are connected to the receiver 38 by the pipe 39 so that refrigerant from either or both of them passes into this receiver. The refrigerant passes out of the receiver through pipe 40 into the pipes 41 and 42, these pipes being provided with the valves 43 and 44. These pipes pass along at the sides of the containers under the floor 30. There is a pipe 45 for each container which connects with the pipe 41 or the pipe 42. In each of these pipes is an expansion valve 46 and leading from each expansion valve is a pipe 47 which connects with the space 7 between each of the cylinders 5 and 6, the connection being made through the opening 12 (Fig. 8). The refrigerant material, after passing back and forth through the space 7 of each container, passes out of said space 7 through the opening 13 (Fig. 8) and through the pipe 48 and passes into the pipes 49 and 50 provided with the valves 51 and 52 and thence it passes by the pipe 53 into the pipe 54 and thence to the compressor 31.

There is an opening in each cover member 22 above each expansion valve 46 provided with a removable closure device 55 so that access can be readily secured to the expansion valves when this becomes desirable for any purpose.

A fuel tank 56 is provided for the truck engine and the refrigerating apparatus engines. This tank is provided with the cap 57 covering the opening through which the fuel is inserted. Fuel is inserted into the tank by lifting up the floor 30. The tank is connected by pipes 58, 59 with the engines 32.

Means is provided for removing oil that may be carried over from the compressor into the space 7 between the cylinders 5 and 6. As herein shown, this is accomplished by means of a pipe 60 (Fig. 7) which is connected to the space 7 near the bottom and with the pipe 48 leading back to the compressor so that suction of the compressor will draw this oil back and return it to the compressor.

Each of the outer cylinders 6 is provided with a projection 6a which projects into the insulating member 17a and which assists in maintaining the cylinders in their proper position.

A step 61 (Fig. 3) is provided for providing easy access to the floor 30. The rear end of the floor 30 rests upon a support 62 a short distance from the rear end of the truck and there is a step member 63 extending from this support and projecting slightly beyond the end of the truck. The step 61 is hinged at 64 to the step member 63. When the step is down in its operative position it engages the bumper 65, there being preferably rubber members 66 interposed between it and the bumper. When the step is not being used, it is moved up so that the part 67 meets the floor 30 and becomes a part of the floor, as shown in dotted lines in Fig. 3.

The cab is provided with a rear view mirror 68, by means of which the driver can have an unobstructed view to the rear without turning his head to look through the rear window 69. This is possible because of the open space between the refrigerated containers.

The base 19 acts as the bottom of the receptacle into which the pipes for the refrigerating apparatus are received. The floor 30 acts as the top of this receptacle and as a removable cover therefor.

Some means is provided for securing easy access to the refrigerating apparatus used to refrigerate the food containers. In the construction shown this is secured by mounting the compressor and other parts of the refrigerating apparatus upon a base (Figs. 1 and 2) which is separate from the truck body and which can be removed through the opening 70 in the side of the truck. This opening is closed by a door 71 which is fastened by suitable fastening devices 72. The pipes 54a is made of flexible material so that it may be of sufficient length to permit the refrigerating apparatus to be moved out of the truck body. When this is done, the connections of the condensers 33 to the pipes 36 and 73 are disconnected by unscrewing the connecting parts. These connecting parts are easily accessible because they are at the outside.

There is preferably a handle device 73 connected with the heat interceptors (Figs. 3 and 5) by means of which they can be raised and lowered. The members 27, 28 are arranged so that they support the heat interceptors in their open position and the handle 73 is attached to one of these, being shown attached to the member 27.

Some means is preferably provided for holding the container covers 4a in their closed position. This is done by means of the member 74 (Figs. 3 and 5) attached to the members 28 and which are provided with projections 75 which engage projections 76 on the container covers. It will be seen that when the heat interceptors 23 are in their down position the projections 75 engage the projections 76 so as to hold the covers closed. When the heat interceptors are raised, the covers are released.

It will be seen that there is here provided a refrigerated truck having a body formed of refrigerated containers for the food, the containers being separated by a non-refrigerated space, by means of which access is secured to such refrigerated containers, there being means for preventing the escape of cold air from such refrigerated containers into the non-refrigerated space while the food is being removed from such containers.

The bottoms of the containers are below the driver's seat and the tops of the containers are at armpit height for the average person standing on the floor 30 so that articles on the interior of the bottom portion may be easily reached by the average person.

The use and operation of my invention are as follows:

In the use of frozen foods, for example, such foods must be delivered to the user in a proper frozen condition. By means of my invention the frozen foods or other materials to be delivered in a cold condition are placed in the containers. They are preferably frozen at a central plant, although they may, of course, be frozen in the truck, if desired, but this would limit the use of the truck as it takes time to freeze the food.

The party who puts the frozen food or other material into the containers passes with the food into the non-refrigerated passageway between the sets of containers, lifts the heat interceptor 23 and removes the covers 4a from the containers, and deposits the food or other material in the containers. The covers are then placed on the containers and the heat interceptors moved to their closed position.

The truck may then be driven to the various points of delivery, the driver being able to see through the space between the sets of containers so that he has a clear view of whatever is at the rear of the truck, making it easy for him to drive and to back the truck into delivery or other positions.

The heat interceptors 23 intercept the heat of the sun rays and the heat due to the sun rays escapes through the openings 25 so as not to heat the containers or the material therein.

The party who is purchasing the food may easily pass up the steps to the floor 30 and lift up the heat interceptors 23 and the covers 4a and look into the receptacles so as to see the food to be delivered. The delivery man can then remove as much of this food as the given customer is to receive and deliver it to the customer. During all of this process the customer and the delivery man are standing in the non-refrigerated space or passageway between the containers.

With this invention everything is open to the daylight and no heat of lamps acts to heat the containers or the food therein. Furthermore no cold air drops out of any of the containers when the customer or the delivery man enters the truck body or while the customer is looking at the foods in the coolers or while the foods are being removed from the containers.

After the food containers are reduced to the proper low temperature and the food therein frozen, metal cylinders 5 and 6 and the refrigerant in between them act as a hold-over so that the refrigerating apparatus need not be operated, as a rule, during the delivery, as this hold-over action keeps the foods properly frozen. When, of course, it becomes desirable, the refrigerating apparatus may be set in operation so as to insure the proper temperature in the containers. This, of course, would be necessary where long trips are made in the delivery of the frozen food.

It will be seen that there is here provided an open truck with refrigerated containers into which the frozen foods are received, and that in between these containers is an open space which is not refrigerated and into which individuals who wish to inspect or remove or insert the foods pass, that no lights or other heat producing devices are used in the space where the foods are contained or in any space which would tend to heat this space or these foods, and that by means of this open truck frozen foods can be delivered to any distant point desired without loss of cold due to the spilling out of cold air at any time, either when the food is inspected or removed from the truck.

It will further be seen that the driver has a free view of what is in the rear of the truck, which is of very great importance in the proper handling of the truck both in avoiding traffic and in backing into delivery or other positions.

In the construction shown the truck body is made up of a plurality of separated metal cylinders acting as evaporators or cooling elements, the cylinders being insulated. The cylinders or evaporators in this construction form the strengthening elements of the truck body and with the insulation constitute the refrigerated body of the truck.

I claim:

1. A refrigerated truck comprising a body formed of evaporators which act as containers into which the material to be cooled is received, said containers being formed into two sets separated by a non-refrigerated space in which individuals stand when inserting materials into or removing materials from said containers, and a heat interceptor located above each set of said containers and separated therefrom by a space, said space having a connection below said heat interceptors to the outside atmosphere through which air heated by the sun striking the heat interceptors escapes without heating the containers.

2. A refrigerating truck comprising a plurality of evaporators mounted thereon, each evaporator having two covers, one above the other and separated by a space communicating with the outside atmosphere, the upper cover acting as a heat interceptor.

3. A refrigerating truck comprising a chassis, a driver's cab mounted on said chassis, a truck body connected with and supported upon said chassis comprising a plurality of vertical cylindrical evaporators, heat insulating material surrounding the vertical surfaces of said evaporators and extending between them, heat insulating material extending along the exterior of the bottoms of said evaporators, an outer casing extending around the evaporators and the insulation therefor so as to form a unitary structure, a refrigerating element connected with said evaporators, comprising a compressor, a motor and a condenser, a receptacle therefor located to the rear of said driver's cab, and a platform extending longitudinally along said evaporators at one side thereof.

4. A refrigerated truck, adapted for dispensing frozen materials, including a truck body, a power plant therefor, a driver's cab, a longitudinal walk behind said cab, extending forwardly to said cab and providing a free rear view space for the cab, and a storage and dispensing unit located at one side of said walk, in a position adapted to permit an unobstructed view of the driver from the rear of the cab along said walk, said storage and dispensing unit extending upwardly from the level of said walk and including an open topped evaporator adapted to serve as a container for the articles to be stored, the top of said evaporator being at a height convenient for an operator standing on said walk, a removable closure for the open top of said evaporator and means for passing a refrigerant through said evaporator, and a heat interceptor located above said removable closure.

5. A refrigerated truck, adapted for dispensing frozen materials, including a truck body, a power plant therefor, a driver's cab, a longitudinal walk behind said cab extending forwardly to said cab and providing a free rear view space for the cab, and a storage and dispensing unit located at each side of said walk and extending longitudinally therealong in a position adapted to permit an unobstructed view of the driver from the rear of the cab along said walk and between said units, each said storage and dispensing unit extending upwardly from the level of said walk and including a plurality of open topped evaporators, each adapted to serve as a container for the articles to be stored, the tops of said evaporators being at a height convenient for an operator standing on said walk, removable closures for each said evaporator, and means for passing a refrigerant through said evaporators, said evaporators being aligned longitudinally along one side of the truck body, and a unitary outer housing surrounding said evaporators, and a mass of insulating material between said housing and said evaporators, surrounding and underlying said evaporators, and a separate compressor-condenser unit for each said storage and dispensing unit in circuit with the evaporators thereof, and a single receiver in circuit with both storage and dispensing units and with both compressor-condenser units.

WILLARD L. MORRISON.